United States Patent
Sun et al.

(10) Patent No.: US 9,632,551 B2
(45) Date of Patent: Apr. 25, 2017

(54) CIRCUITRY AND METHODS FOR SWITCHING POWER

(71) Applicant: HEWLETT-PACKARD DEVELOPMENT COMPANY, L.P., Houston, TX (US)

(72) Inventors: Shihwoei Sun, Taipei (TW); Charles N. Shaver, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 991 days.

(21) Appl. No.: 13/628,934

(22) Filed: Sep. 27, 2012

(65) Prior Publication Data

US 2014/0084706 A1    Mar. 27, 2014

(51) Int. Cl.
     *H01H 19/64*      (2006.01)
     *H01H 31/10*      (2006.01)
     *H01H 33/52*      (2006.01)
     *H01H 85/46*      (2006.01)
     *G06F 1/26*      (2006.01)

(52) U.S. Cl.
     CPC ........... *G06F 1/263* (2013.01); *Y10T 307/747* (2015.04)

(58) Field of Classification Search
     USPC ......................................................... 307/113
     See application file for complete search history.

(56) References Cited

U.S. PATENT DOCUMENTS

| | | | | |
|---|---|---|---|---|
| 5,027,002 A | * | 6/1991 | Thornton | ................ G05F 1/577 307/19 |
| 5,309,348 A | | 5/1994 | Leu | |
| 6,700,333 B1 | * | 3/2004 | Hirshi | ................. H02M 5/2573 307/115 |
| 7,714,610 B2 | | 5/2010 | He | |
| 8,225,125 B2 | | 7/2012 | Yu et al. | |
| 2009/0278488 A1 | * | 11/2009 | Choi | ..................... H02J 7/0016 320/103 |
| 2011/0125341 A1 | * | 5/2011 | Heath | ..................... H02J 1/108 700/295 |
| 2011/0157971 A1 | * | 6/2011 | Kim | ......................... G11C 11/16 365/171 |

FOREIGN PATENT DOCUMENTS

TW      200915701      4/2009

OTHER PUBLICATIONS

Choi, et al. An Analysis Methodology for Dynamic Power Gating. Sequence Design Inc. 469 El Camino Real, Suite 202, Santa Clara, CA 95050. U.S.A.

* cited by examiner

*Primary Examiner* — Hal Kaplan
*Assistant Examiner* — Xuan Ly
(74) *Attorney, Agent, or Firm* — HP Inc. Patent Department

(57) ABSTRACT

Circuitry and methods related to switching power are provided. One of a plurality of current-limited power distribution switches is enabled in accordance with a hierarchical scheme depending upon the respective states of plural power sources. The power source having the greatest available load carrying capacity is thus coupled to a power node for provision to load entities. Servers, computing devices, printers, and other apparatus can include such selective power provisioning.

13 Claims, 5 Drawing Sheets

| ELEMENT | PART / DESCRIPTION | SOURCE |
| --- | --- | --- |
| 102 | TPS2062DR – DUAL SWITCH | TEXAS INSTRUMENTS |
| 110 | BAT54CH – DIODE PAIR | PANJIT SEMICONDUCTOR |
| 114 | ROCKER SWITCH | DIPTRONICS |
| 118 | 1.0K OHM RESISTOR - 0.25W | -VARIOUS- |
| 120 | 2N7002 – N-MOSFET | NXP SEMICONDUCTORS |
| 122 | 4.7K OHM RESISTOR – 0.25W | -VARIOUS- |
| 124 | 8.2K OHM RESISTOR – 0.25W | -VARIOUS- |
| 126 | 1.0K OHM RESISTOR - 0.25W | -VARIOUS- |
| 132 | 10.0 MICROFARAD CAP. – 6.3V | -VARIOUS- |
| 134 | TPS2062DR – DUAL SWITCH | TEXAS INSTRUMENTS |
| 144 | 10.0 MICROFARAD CAP. – 6.3V | -VARIOUS- |
| 146 | 2N7002 – N-MOSFET | NXP SEMICONDUCTORS |
| 148 | 1.0K OHM RESISTOR - 0.25W | -VARIOUS- |
| 150 | 22.0 OHM RESISTOR - 0.25W | -VARIOUS- |
| 152 | 2N7002 – N-MOSFET | NXP SEMICONDUCTORS |
| 156 | 2N7002 – N-MOSFET | NXP SEMICONDUCTORS |
| 158 | 1.0K OHM RESISTOR - 0.25W | -VARIOUS- |
| 160 | 10K OHM RESISTOR - 0.25W | -VARIOUS- |
| 162 | 2N7002 – N-MOSFET | NXP SEMICONDUCTORS |
| 164 | 1.0K OHM RESISTOR - 0.25W | -VARIOUS- |
| 166 | 1.0K OHM RESISTOR - 0.25W | -VARIOUS- |
| 172 | 10.0 MICROFARAD CAP. – 6.3V | -VARIOUS- |
| 174 | 10.0 MICROFARAD CAP. – 6.3V | -VARIOUS- |
| 176 | 10.0 MICROFARAD CAP. – 6.3V | -VARIOUS- |
| 178 | 10.0 MICROFARAD CAP. – 6.3V | -VARIOUS- |

FIG. 2

CIRCUITRY AND METHODS FOR
SWITCHING POWER

BACKGROUND

Client servers, printers, computers and other apparatus require electrical energy in order to perform their respective normal functions. Plural sources of operating power having respectively different load carrying capacities are available within numerous such devices and systems. The present teachings address the foregoing and related concerns.

BRIEF DESCRIPTION OF THE DRAWINGS

The present embodiments will now be described, by way of example, with reference to the accompanying drawings, in which:

FIG. 2 depicts a table of electronic circuit elements according to one example of the circuitry of FIGS. 1A-1B;

DETAILED DESCRIPTION

Introduction

Circuitry and methods related to switching power are provided. A selected one of a plurality of current-limited power distribution switches is enabled in accordance with a hierarchical scheme, depending upon the respective states of a plurality of power sources. Non-limiting examples of power sources include an AC adapter, a battery or batteries, a USB port of a computer or similar device, and so on. The power source having the greatest available load carrying capacity is coupled to a power node for provision to load entities. Servers, printers, and other apparatus can include selective power provisioning.

In one example, an electronic circuit includes a power switch, and a first current-limited power distribution switch (CLPDS) and a second CLPDS. Each CLPDS includes at least one output, and the respective outputs are coupled to a common node. The electronic circuit also includes circuitry to enable operation of the first CLPDS and disable operation of the second CLPDS when a first supply voltage is present and the power switch is in an 'ON' state. The circuitry also enables operation of the second CLPDS when the first supply voltage is not present and a second supply voltage is present and the power switch is in an 'ON' state.

In another example, a method is performed by an electronic circuit, including the enabling a first current-limited power distribution switch (CLPDS) in response to an energized state of a first power source and an 'ON' state of power switch. The method also includes disabling a second CLPDS in response to an energized state of the first power source. The method further includes coupling the first power source to a power node by way of the first CLPDS.

First Illustrative Circuitry

An embodiment of electronic switching circuitry (circuitry) 100 according to the present teachings is now described. Such circuitry 100 is shown by way of FIGS. 1A-1B, collectively. Other embodiments of switching circuitry can also be used in accordance with the present teachings.

Figure 1A:
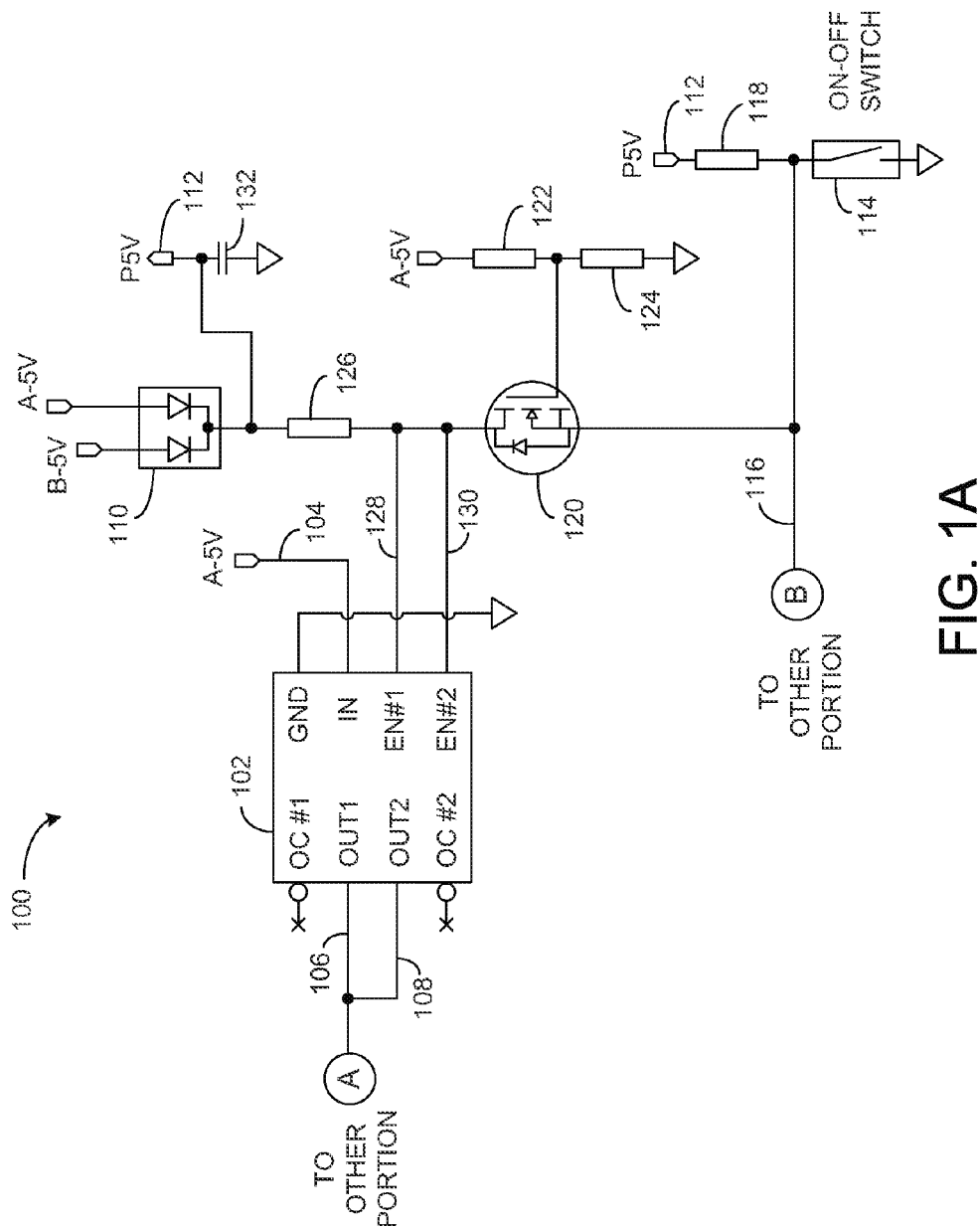
FIG. 1A depicts a schematic diagram of a portion of electronic switching circuitry according to one example of the present teachings.

With reference to FIG. 1A, a first portion of the circuitry 100 includes a current-limited power distribution switch (CLPDS) 102. In one example, the CLPDS 102 is defined by a model TPS2062DR, as available from Texas Instruments Incorporated, Dallas, Tex., USA. Other suitable switching circuits or control devices can also be used. The CLPDS 102 includes (or is defined by) an input node 104 and respective output nodes 106 and 108. The CLPDS 102 is configured to receive electrical energy at the input node 104, and to couple that energy to the respective outputs 106 and 108 by way of internal switching, in accordance with enablement signaling. Further elaboration regarding the CLPDS 102 is provided hereinafter.

The circuitry 100 also includes a steering (or isolation) diode pair 110 configured to couple the circuitry 100 to respective power sources "A-5V" and "B-5V", and to provide a corresponding electrical voltage at a node 112, labeled as "P5V". In one example, the steering diode pair 110 is defined by a model BAT54CH, as available from PanJit Semiconductor, Kaohsiung, Taiwan. Other suitable steering diodes, either discrete or pairs provided by way of integrated devices, can also be used.

In one example, the power source A-5V is defined by (or is coupled to) an alternating-current (AC) adapter configured to provide five volts of direct-current (DC) energy derived from a line-voltage source. By the same example, the power source B-5V is defined by (or is coupled to) a universal serial bus (USB) port of a computer or other electronic entity configured to provide five volts of DC energy. Other suitable and various examples of power sources can also be used. In one example, the power source A-5V has a greater load carrying (electrical current) capacity than that of the power source B-5V.

The circuitry 100 also includes a power switch 114. In one example, the power switch 114 is defined by a rocker-type power switch that is sellable by way of user manipulation. The power switch 114 is configured to couple a node 116 to ground potential when the power switch 114 is in an electrically conductive (i.e., "ON") state. Otherwise, the node 116 is biased toward the voltage P5V at the node 112 by way of a resistor 118.

The circuitry 100 further includes a metal-oxide semiconductor field-effect transistor (MOSFET) 120, configured to operate as a switch. In one example, the MOSFET 120 is defined by a model 2N7002 N-Channel MOSFET, as available from NXP Semiconductors, Eindhoven, The Netherlands. Other suitable MOSFETs or switching elements can also be used. The MOSFET 120 is coupled to respective resistors 122 and 124, which define a voltage divider coupled between the power source A-5V and ground potential. The MOSFET 120 is biased "ON" when the power source A-5V is energized (i.e., there is sufficient potential relative to ground). The MOSFET 120 is otherwise electrically non-conductive between its source and drain nodes (i.e., "OFF").

The circuitry 100 also includes a resistor 126 coupled to node 112. The CLPDS 102 includes respective enable inputs 128 and 130, which are coupled together. The enable inputs 128 and 130 are biased toward potential P5V (i.e., "HIGH") by way of the resistor 126. Additionally, the enable inputs 128 and 130 are pulled toward ground potential (i.e., "LOW") when both the power switch 114 and the MOSFET 120 are respectively "ON". Thus, the CLPDS 102 is enabled to operate when the power switch 114 is "ON" and there is normal voltage (e.g., five volts) present at the power source A-5V. The CLPDS 102 is otherwise not enabled if either (or both) of the immediate foregoing conditions is not met. The circuitry 100 also includes a ripple (or noise) filtering-capacitor 132.

Figure 1B:
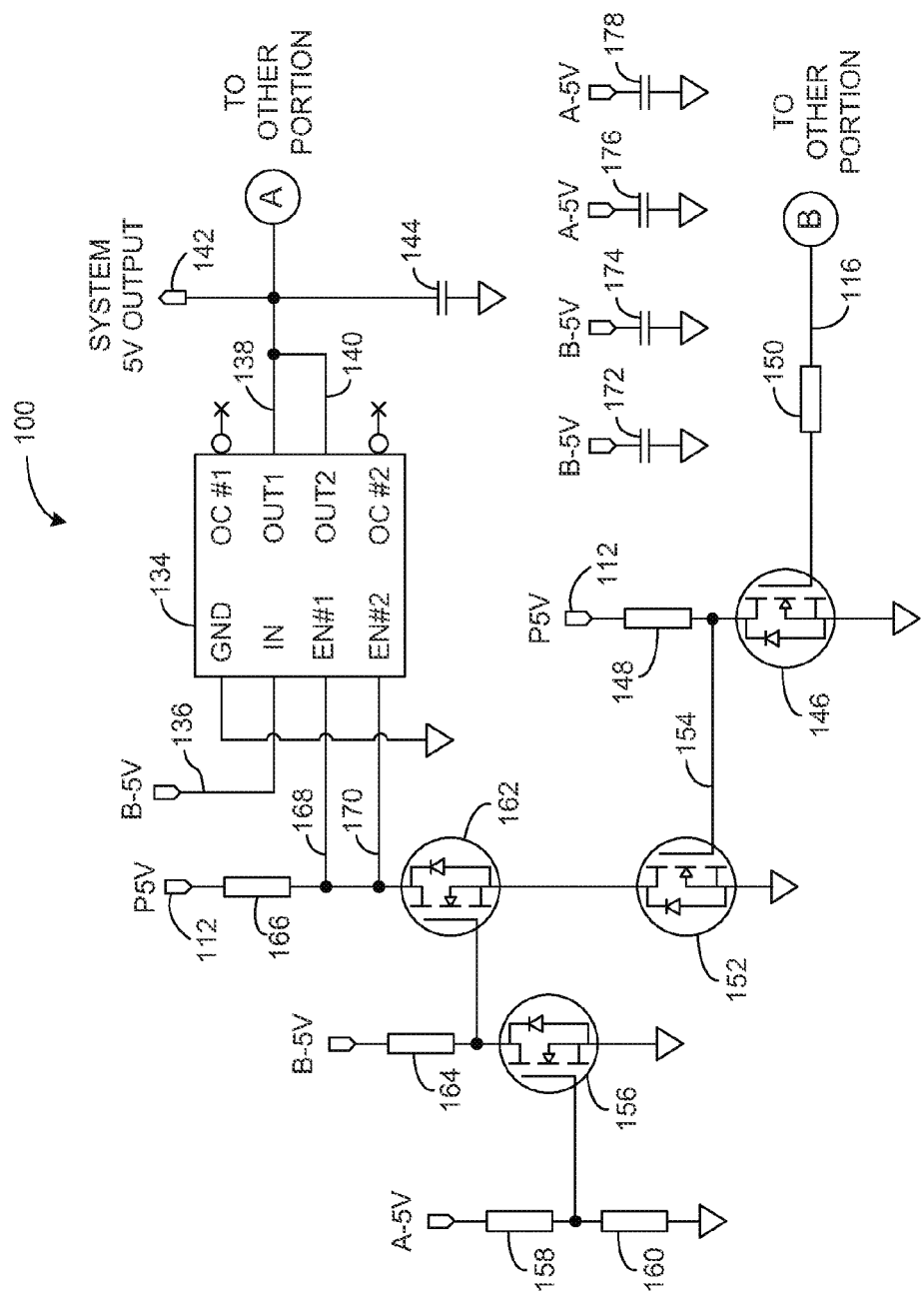
FIG. 1B depicts a schematic diagram of the other portion of the circuitry of FIG. 1A.

Referring now to FIG. 1B, a second portion of the circuitry 100 includes a CLPDS 134. In one example, the CLPDS 134 is equivalent to the CLPDS 102. Other suitable switching circuits 134 can also be used. The CLPDS 134 includes (or is defined by) an input node 136 and respective output nodes 138 and 140. The CLPDS 134 is configured to receive electrical energy at the input node 136, and to couple that energy to the respective outputs 138 and 140 by way of internal switching, in accordance with enablement signaling.

The outputs 106 and 108 of the CLPDS 102, and the outputs 138 and 140 of the CLPDS 134, are commonly electrically coupled (or directly connected) to a power node 142. The power node 142 is also referred to as a system power node 142 for purposes herein. Further elaboration regarding the CLPDS 134 is provided hereinafter. The circuitry 100 also includes a ripple or noise-filtering capacitor 144.

The circuitry 100 also includes a MOSFET 146, configured to operate as a switch. In one example, the MOSFET 146 is defined by a model 2N7002. Other suitable MOSFETs or switching elements can also be used. The MOSFET 146 is coupled to electrical potential P5V at the node 112 by way of a resistor 148. The MOSFET 146 is also coupled to be biased by potential at the node 116 by way of a resistor 150. The MOSFET 146 is biased "ON" when the power switch 114 is "OFF". The MOSFET 146 is otherwise "OFF".

The circuitry 100 also includes a MOSFET 152, configured to operate as a switch. In one example, the MOSFET 152 is a model 2N7002. Other suitable MOSFETs or switching elements can also be used. The MOSFET 152 is coupled to be biased by potential at a node 154. The MOSFET 152 is biased "ON" when the MOSFET 146 is "OFF". The MOSFET 152 is otherwise "OFF".

The circuitry 100 additionally includes a MOSFET 156, configured to operate as a switch. In one example, the MOSFET 156 is a model 2N7002. Other suitable MOSFETs or switching elements can also be used. The MOSFET 156 is coupled to respective resistors 158 and 160, defining a voltage divider coupled between power source A-5V and ground potential. The MOSFET 156 is biased "ON" when the power source A-5V is energized. The MOSFET 156 is otherwise "OFF".

The circuitry 100 further includes a MOSFET 162, configured to operate as a switch. In one example, the MOSFET 162 is a model 2N7002. Other suitable MOSFETs or switching elements can also be used. The MOSFET 162 is biased by the power source B-5V by way of a resistor 164. Generally, the MOSFET 162 is biased "ON" when the MOSFET 156 is "OFF". In particular, the MOSFET 162 is biased "ON" when the power source B-5V is energized and the power source A-5V is not energized.

The circuitry 100 also includes a resistor 166 coupled to the node 112. The CLPDS 134 includes respective enable inputs 168 and 170, which are coupled together. The enable inputs 168 and 170 are biased toward potential P5V (i.e., "HIGH") by way of the resistor 166. The enable inputs 168 and 170 are pulled "LOW" when the MOSFET 162 and the MOSFET 152 are both "ON". Thus, the CLPDS 134 is enabled to operate when the power switch 114 is "ON" and there is normal voltage (e.g., five volts) present at the power source B-5V and normal voltage is not present (i.e., is about ground, or floating) at the power source A-5V. The CLPDS 134 is otherwise not enabled if any one or more of the immediate foregoing conditions is not met.

General, normal operation of the circuitry 100 is as follows: Electrical energy (voltage) is provided by the power source A-5V, or the power source B-5V, or both. This power provisioning results in voltage present at the node 112 (P5V). For purposes of a present illustration, the power sources A-5V and B-5V are both energized and providing normal voltages. A user toggles the power switch 114 from an "OFF" state to an "ON" state, in which it remains for the duration of this example.

The MOSFET 120 is biased "ON" by the voltage at A-5V, such that ground potential from the node 116 is coupled to the enable inputs 128 and 130. The CLPDS 102 is enabled by "LOW"-level signaling and is therefore activated. Electrical energy from the power source A-5V is thus switched (coupled) from the node 104 to the respective outputs 106 and 108. This corresponding electrical energy at A-5V is now available at the system power node 142, and can be provided to one or more load devices, circuits, and so on.

The energized state of the power source A-5V causes the MOSFET 156 to provide ground potential to the control node (gate) of the MOSFET 162, which is held in an "OFF" state, accordingly. The enable inputs 168 and 170 are subject to "HIGH"-level enable signaling by virtue of the voltage P5V at the node 112. The CLPDS 134 is therefore inactive, and electrical energy from the power source B-5V is isolated from the system power node 142. Thus, the CLPDS 102 is enabled, and the CLPDS 134 is not enabled.

Now, the present illustration assumes that the power source A-5V is effectively de-energized (e.g., the corresponding AC adapter is "unplugged"). The MOSFET 120 is biased "OFF", resulting in "HIGH"-level signaling at the enable inputs 128 and 130. The CLPDS 102 is now effectively disabled.

The de-energized state of the power source A-5V causes the MOSFET 156 to be biased "OFF", resulting in the MOSFET 162 being biased "ON". The MOSFET 146 is "OFF" by virtue of the grounded state of the node 116. The MOSFET 152 is biased "ON" by way of the P5V voltage at the node 112, causing ground level-potential to be passed through the MOSFET 162 and to the enable inputs 168 and 170. The CLPDS 134 is therefore enabled, and electrical energy from the power source B-5V is now provided to the system power node 142. Such electrical voltage can be provided to load devices, circuits, and so on.

In conclusion of the present illustration, it is assumed that a user manually toggles the power switch 114 to an "OFF" state. The node 116 is now biased "HIGH" as a result, with the overall effect of disabling both the CLPDS 102 and the CLPDS 134. Neither the power source A-5V nor the power source B-5V are connected to the system power node 142, effectively shutting off electrical energy to any load or loads coupled thereto.

Illustrative Circuit Elements Table

Reference is now made to FIG. 2, which depicts a table 200. The table 200 includes specific models, electrical values and characteristics, and commercial sources for elements of one illustrative embodiment of the circuitry 100. Other examples of electronic switching circuitry having other respectively varying elements or electrical values can also be used in accordance with the present teachings.

Illustrative Method

Figure 3:
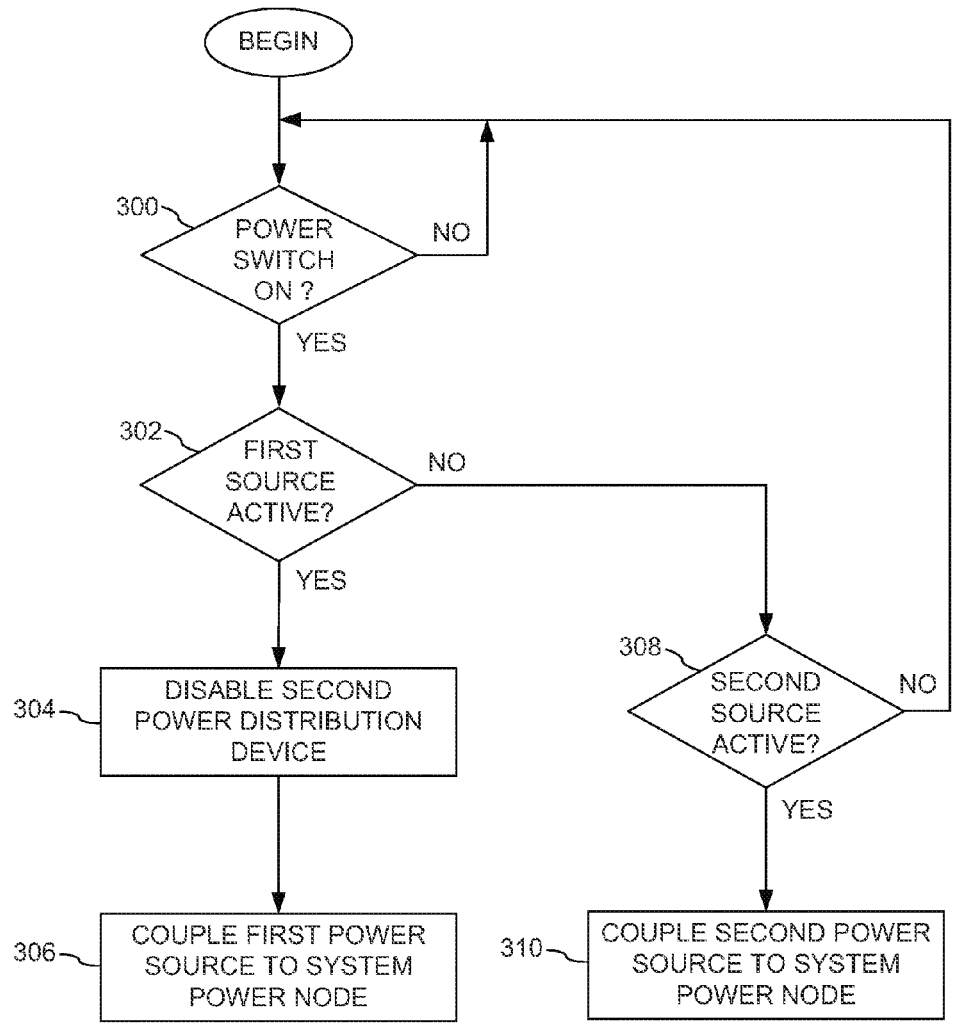
FIG. 3 depicts a flow diagram of a method according to the present teachings.

Reference is now made to FIG. 3, which depicts a flow diagram of a method according to another example of the present teachings. The method of FIG. 3 includes particular steps and proceeds in a particular order of execution. However, it is to be understood that other respective methods including other steps, omitting one or more of the depicted steps, or proceeding in other orders of execution can also be used. Thus, the method of FIG. 3 is illustrative and non-limiting with respect to the present teachings. Reference is also made to FIGS. 1A-1B in the interest of understanding the method of FIG. 3.

At 300, it is determined if a power switch is "ON". For purposes of a present example, the electronic circuitry 100 begins normal operation if the power switch 114 is in an "ON" state—that is, if node 116 is coupled to ground potential. If the power switch 114 is "ON", the method proceeds to step 302 below the power switch 114 is "OFF", the method dwells at step 300.

At 302, it is determined if a first power source is active. With respect to the ongoing example, if the power source A-5V is active (i.e., energized), the method proceeds to step 304 below. If the power source A-5V is not active, the method proceeds to step 308 below.

At 304, a second power distribution device is disabled. In the present example, the energized state of the first power source A-5V causes the MOSFET 156 to provide ground potential to the gate of the MOSFET 162. Thus, the MOSFET 162 is biased into a non-conductive state, resulting in voltage P5V at the node 112 being provided to the respective enable inputs 168 and 170. The CLPDS 134 is effectively disabled and the second power source B-5V is isolated from the system power node 142.

At 306, the first power source is coupled to the system power node. For purposes of the present example, the energized state of the first power source A-5V causes the MOSFET 120 to couple ground potential to the respective enable inputs 128 and 130. The CLPDS 102 is effectively enabled and the first power source A-5V is coupled (or switched) there through to the system power node 142. Such electrical energy at the power node 142 can be provided to one or more load devices or entities.

At 308, it is determined if a second power source is active. In the ongoing example, if the power source B-5V is active (i.e., energized), the method proceeds to step 310 below. If the power source B-5V is not active, the method returns to step 300 above.

At 310, the second power source is coupled to the system power node. For purposes of the present example, the de-energized state of the first power source A-5V causes the MOSFET 156 to assume a non-conductive state, such that the second power source B-5V biases the MOSFET 162 into conduction. The MOSFET 154 is conductive by virtue of the voltage P5V and ground potential is coupled through to the respective enable inputs 168 and 170. The CLPDS 134 is effectively enabled and the second power source B-5V is coupled (i.e., switched) to the system power node 142. Such electrical energy at the power node 142 can be provided to one or more load devices or entities.

The method described above results in the provision of power to a system (or common) power node from one of two possible sources in accordance with a hierarchical selection schema. Power from a first source—typically having a relatively greater load carrying capacity—is preferentially provided if such is available. Alternatively, power from a second source is provided if available and if the first source is unavailable. The foregoing methodology can be applied to other circuits and examples having three or more power sources, as well. The foregoing method is described as a sequence of discrete steps in the interest of clarity. However, it is to be understood that circuits in accordance with the present teachings can operate such that respective actions are performed in an essentially contemporaneous manner.

Illustrative Computing Device

Figure 4:
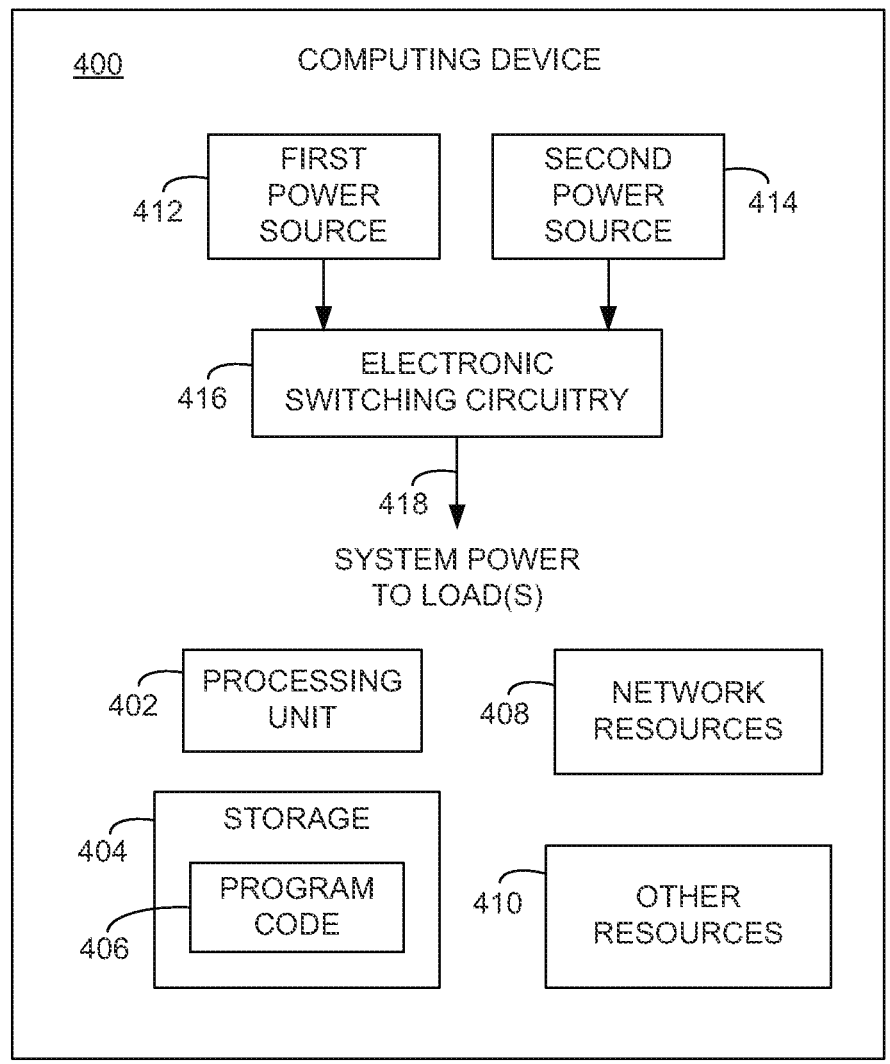
FIG. 4 depicts a block diagram of a computing device according to another example of the present teachings.

Attention is turned now to FIG. 4, which depicts a computing device 400 in accordance with one illustrative and non-limiting example of the present teachings. Other devices, systems and so on that respectively incorporate electronic switching circuitry according to the present teachings are also contemplated.

The computing device 400 includes a processing unit 402 configured to perform numerous operations in accordance with a machine-readable program code. The processing unit 402 therefore controls various normal operations of the computing device 400 accordingly. The computing device 400 also includes storage media 404. The storage media 404 can be defined by any suitable storage media accessible by (i.e., in communication with) the processing unit 402. Non-limiting examples of such storage media include flash memory, non-volatile solid-state memory, magnetic storage media, optical storage media, and so on.

The computing device 400 also includes a machine-readable program code 406 stored within the storage media 404. The program code 406 is configured to cause the processing unit 402 to perform various functions in accordance with normal, various operations of the computing device 400. In one example, the program code 406 defines an operating system. In another example, the program code 406 defines a word processing application. Other suitable examples can also be used.

The computing device 400 also includes network resources 408. The network resources can include or be defined by any electronic circuitry or other constituency configured to couple the computing device 400 in data communication with a network, the Internet, and so on. The computing device 400 further includes other resources 410. The other resources 410 can be defined by or include, without limitation, a keyboard, a mouse, a display or monitor, wireless communication resources, and so on. One having ordinary skill in the computing device or related arts is familiar with various other resources 410 that can be used, and further elaboration is not necessary to understanding the present teachings.

The computing device 400 also includes a first power source 412, and a second power source 414. The power sources 412 and 414 can be respectively and variously defined. In one example, the first power source 412 is defined by a power supply configured to provide one or more DC voltages from an AC line-level supply, and the second power source 414 is defined by a rechargeable battery. Other respectively varying examples can also be used. The first power source 412 has a greater electrical current capacity than that of the second power source 414.

While the power sources 412 and 414 are depicted as respective features of the computing device 400, the present teachings contemplate operations by way of any number of respective power sources internal to, or distinct from, the computing device 400.

The computing device 400 also includes electronic switching circuitry (circuitry) 416. The circuitry 416 is configured to selectively couple electrical energy from either the first power source 412 or the second power source 414 to an output node 418, with preference given to the first power source 412. In one example, the circuitry 416 is equivalent (or analogous) to the circuitry 100. Other suitable circuits in accordance with the present teachings can also be used. The electrical power provided to the node 418 is coupled to provide operating power to the processing unit 402, the storage media 404, and so on, of the computing device 400.

In general and without limitation, the present teachings contemplate electronic circuitry (a circuit or circuits) that selectively couple power from one of a plurality of sources to an output node. Such selection is made according to a hierarchical scheme. In one example, the available power source having the greatest load-carrying capacity is selected. Other selection criteria can also be used. Current-limited power distribution switches (or other switching devices) are respectively enabled or disabled in response to the present state of the power sources and in accordance with the selection hierarchy. The present teachings contemplate that entire circuits consistent therewith can be provided by way of respective application-specific integrated circuits (ASICs), by circuitry including both integrated and discrete devices, and so on.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An electronic circuit, comprising:
   a power switch;
   a first current-limited power distribution switch (CLPDS) and a second CLPDS, each including at least one output, the respective outputs coupled to a common node and coupled to multiple supply voltages including a first supply voltage and a second supply voltage; and
   circuitry to:
      selectively enable one of the first CLPDS or second CLPDS, based on a hierarchical designation in which (i) the first CLPDS is enabled and the second CLPDS is disabled so long as the first supply voltage is present, and (ii) the second CLPDS is enabled and the first CLPDS is disabled so long as the first supply voltage is absent and the second supply voltage is present.

2. The electronic circuit according to claim 1, the electronic circuit to receive the first supply voltage from an alternating-current (AC) adapter coupled to a source of line voltage.

3. The electronic circuit according to claim 1, the electronic circuit to receive the second supply voltage from a universal serial bus (USB) port of an electronic entity.

4. The electronic circuit according to claim 1, the second CLPDS being equivalent to the first CLPDS.

5. The electronic circuit according to claim 1, the circuitry including a pair of steering diodes to couple the circuitry to the first supply voltage and the second supply voltage.

6. The electronic circuit according to claim 5, the pair of steering diodes provided by an integrated device.

7. The electronic circuit according to claim 1, the first CLPDS to couple the first supply voltage to the common node when enabled, the second CLPDS to couple the second supply voltage to the common node when enabled.

8. The electronic circuit according to claim 1, the common node to provide operating electrical power to at least one load entity.

9. The electronic circuit according to claim 1, the power switch defined by a rocker switch manually operable by a user.

10. A method performed by an electronic circuit, comprising:
    providing a supply voltage including a first supply voltage and a second supply voltage, the supply voltage being provided from multiple power voltage inputs; and
    selectively enabling one of a first current-limited power distribution switch (CLPDS) or a second CLPDS, based on a hierarchical designation in which (i) the first CLPDS is enabled and the second CLPDS is disabled so long as the first supply voltage is present, and (ii) the second CLPDS is enabled and the first CLPDS is disabled so long as the first supply voltage is absent and the second supply voltage is present.

11. The method according to claim 10 further comprising receiving electrical power from at least a first power source or a second power source by way of respective steering diodes.

12. The method according to claim 10 further comprising setting a power switch from an 'OFF' state to an 'ON' state in response to a user manipulation of the power switch.

13. The method according to claim 10 further comprising providing operating power to one or more electrical loads by way of a power node.

* * * * *